United States Patent Office 3,446,784
Patented May 27, 1969

3,446,784
RESINOUS COATING COMPOSITION
Henry C. Kao, Dearborn, Mich., assignor, by mesne assignments, to Interchemical Corporation, New York, N.Y., a corporation of Ohio
No Drawing. Filed Feb. 23, 1965, Ser. No. 434,605
Int. Cl. C08f 15/40; C08g 37/32
U.S. Cl. 260—78.5   3 Claims

ABSTRACT OF THE DISCLOSURE

A resinous coating composition particularly suitable for coating coils of aluminum and other metallic sheet material which subsequently can be post-formed into metallic siding of the proper configuration. The coating composition comprises a solution of a volatile organic solvent containing from 5% to 20% by weight of substantially monomeric hexamethoxymethyl melamine and 80% to 95% by weight of an interpolymer comprising 50% to 70% of an acrylic monomer, 2% to 8% of an organic acid and from 10% to 30% of acrylonitrile.

---

The present invention relates to a resinous coating composition, and more particularly to a coating composition comprising a vinyl interpolymer and a melamine resin which combine to result in an applied film which is particularly well adapted for outdoor applications.

It is known in the art to prepare vinyl interpolymers by polymerization of vinyl compounds with alpha, beta-olefinic carboxylic acids, and to cure such resins in the presence of a melamine resin. However, there has been an unsatisfied need for such a composition having satisfactory characteristics for application to a metal substrate which is to be subjected to outdoor weathering.

For example, such compositions are desirable for painting aluminum or other metallic siding. Long strips of aluminum siding are painted at the factory and coiled into large rolls for shipment to the point of use. At the point of use, the siding is cut and formed to the requirements of the building onto which the siding is being applied. One problem which has been encountered in prior art compositions is that when the coating composition is made soft enough to have sufficient flexibility for coiling and post-forming, it has had a degree of tackiness resulting in the layers of the roll sticking together or produces a mottling effect on the paint.

The present invention, while not restricted to use on aluminum or other metallic siding, has characteristics which make it eminently suitable for such use. It has been used in a method for applying a protective and decorative coating to siding material with subsequent coiling and post-forming and has yielded excellent results. The composition has good flexibility which permits coiling and post-forming. Its impact resistance is high, thus resisting damage due to hail or ladders being placed against the building. The composition also has good adherence to both primed and unprimed metal. The hardness is sufficient for good durability, and the composition has good resistance to cracking, peeling, blistering and chipping. Additionally, the composition has excellent curing characteristics and does not require high temperatures and long periods of curing time to obtain the desired hardness and other desired properties of the applied film.

The resinous coating composition of the invention comprises from about 5 to 20% by weight of hexamethoxymethyl melamine and from about 80% to 95% by weight of a vinyl interpolymer. The vinyl interpolymer comprises from about 50% to 70% by weight of a monomer selected from the group consisting of ethyl acrylate, butyl acrylate and butyl methacrylate, from about 2% to 8% by weight of an acid selected from the group consisting of acrylic acid, methacrylic acid, itaconic acid and itaconic anhydride, and from about 10% to 30% by weight of acrylonitrile. These resinous materials are dissolved in an organic solvent to which pigment and other adjuvants may be added as desired. One preferred modification of the interpolymer is the addition of a hard vinyl monomer such as methyl methacrylate, styrene or vinyl toluene. The harder monomers may be used in amounts of up to 20% by weight.

The particular melamine resin which has been chosen as a crosslinking agent for the coating composition has unexpectedly resulted in a cured film having the desired group of properties. Hexamethoxymethyl melamine is essentially monomeric. The use of a monomeric melamine resin is a departure from the standard type of melamine resin used in coating compositions, the standard type being polymeric rather than monomeric.

The preparation of hexamethoxymethyl melamine is disclosed in a publication entitled "Cymel 300" issued by the American Cyanamid Company. As set forth in this publication, the structural formula is as follows:

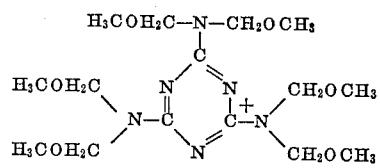

The physical properties of the pure material are as follows:

Appearance _____ White crystals.
Molecular weight _____ 390.
Melting point _____ 55° C.
Vapor pressure _____ 0.02–0.03 mm. at 180° C.

The following examples are illustrative of a coating composition prepared in accordance with the present invention:

Example I.—Preparation of interpolymer

A solvent mixture consisting of 60 grams of toluol, 90 grams of xylol and 100 grams of a high solvency naphtha (B.P. 347–428° F.) were charged to a reaction vessel and heated to reflux. In a separate container, 414 grams of ethyl acrylate, 90 grams of acrylonitrile, 24 grams of glacial methacrylic acid and 72 grams of styrene were mixed with 4.8 grams of ditertiary butyl peroxide and 3.0 grams of benzoyl peroxide. The monomer peroxide mixture was slowly added at a uniform rate to the refluxing solvents in about three hours. Refluxing was continued for two hours. 0.8 gram of di tertiary butyl peroxide in 100 grams of high solvency naphtha was added to the polymerization mass in 30 minutes. Heating at reflux was continued for another three hours and a solvent mixture containing 50 grams of high solvency naphtha and 200 grams of butyl Cellosolve acetate was added. The conversion of this polymerization reaction was 98.8 percent of theoretical. The physical constants of the resulting interpolymer were as follows:

Total nonvolatile _____ 49.4%.
Viscosity _____ Z3 (Gardner Bubble viscometer).
Acid number on solution _____ 12–13.

Example II.—Clear baking enamel

A clear baking enamel, possessing decorative properties and providing protection against tarnish when applied over various metallic objects, such as stainless steel, copper, brass, steel and etc. was prepared by blending 90 parts by weight of the interpolymer product of Example I with 10 parts by weight of hexamethoxymethyl melamine. Excellent adhesion, flexibility and reasonably resistance to stains were obtained when films of the above composition were heat cured.

Example III.—Gloss pigmented enamel

A paste consisting of 175 grams of a high grade commercial titanium dioxide, 50 grams of the interpolymer solution of Example I, 50 grams of high solvency naphtha and 25 grams of butyl Cellosolve acetate was prepared by dispersion in a laboratory mill to a North standard fineness of 7½–8. The pigment dispersion was admixed with 250 grams of the interpolymer shown in Example I, 17 grams of hexamethoxymethyl melamine, 42 grams of butyl Cellosolve acetate and 0.175 gram of silicone oil.

The physical constants of the resulting enamel are:

Pigment/binder ratio _____ 105/100
Total non-volatile (percent) _____ 56.3
Interpolymer solids/hexamethoxymethyl melamine (by weight) _____ 90/10

The enamel shown in Example III was applied over anodized aluminum with an R. D. Specialties No. 36 Coating Rod and baked one minute at 475° F. The resulting cured film of about one mil thickness was insoluble in acetone, showed a pencil hardness of H and possessed outstanding adhesion and flexibility. Curing of the film was equally effective at lower temperatures provided the baking times were correspondingly lengthened.

Although the coating composition described in Example III is best suited for coil coating (strip coating) application on aluminum, excellent results over other metal substrates, such as stainless steel, copper, brass, cold-rolled steel, phosphate treated steel, galvanized steel and tin plate steel, were also obtained.

This coating composition may be applied by spray application when reduced to proper spray viscosity with volatile solvents, such as ketones, esters, aromatic and semi-aromatic hydrocarbons.

Example IV.—Flat and semi-gloss enamels

Enamels, varying from flat to semi-glass were produced by incorporating a colloidal silica type of inert pigment, such as Pittsburgh Plate Glass Hi-Sil 233 or Davison Chemical Syloid 162. The flattening pigment can be dispersed in the enamel composition as shown in Example III, or a separate flattening paste can be prepared by dispersing the flattening pigment in a small amount of a mixture of the interpolymer shown in Example I and the necessary solvent. This paste can then be blended with the enamel of Example III. Film properties equal to those shown in Example III were obtained when heat cured.

Pastel enamels can be prepared by tinting the white bases with colored pigment pastes. The tinting pastes are generally prepared by dispersing the colored pigments in the clear coating composition shown in Example II.

The following table of Examples V through XIV illustrates the wide scope of other interpolymers which can be cross linked with hexamethoxymethyl melamine wherein the components are recited in terms of grams:

| Examples | V | VI | VII | VIII | IX | X | XI | XII | XIII | XIV |
|---|---|---|---|---|---|---|---|---|---|---|
| Monomers: | | | | | | | | | | |
| Methyl Methacrylate | 20 | | | | | | | | | |
| Ethyl Acrylate | 61 | 65 | 28 | 71 | 69 | 65 | 69 | 69 | 70 | 45 |
| Butyl Acrylate | | | 28 | | | | | | | |
| Butyl Methacrylate | | | | | | | | | | 22 |
| Styrene | | 16 | 16 | 10 | 10 | | 12 | 2 | | 12 |
| Vinyl Toluene | | | | | | 16 | | | | |
| Acrylonitrile | 15 | 11 | 20 | 15 | 15 | 15 | 15 | 25 | 28 | 15 |
| Acrylic Acid | | | | | | | 4 | | | 6 |
| Methacrylic Acid | 4 | 8 | | | 4 | | | 4 | 2 | |
| Itaconic Acid | | | 8 | 4 | | | | | | |
| Itaconic Anhydride | | | | | | 6 | | | | |
| Catalysts: | | | | | | | | | | |
| Di-t-butyl Peroxide | 0.93 | 0.93 | | 1.07 | 0.93 | 0.93 | 0.93 | 1.28 | 1.25 | 1.00 |
| Benzoyl Peroxide | 0.50 | 0.50 | 0.50 | 0.75 | 0.50 | | 0.50 | 0.50 | 0.50 | 0.50 |
| t-Butyl Perbenzoate | | | 1.39 | | | | | | | |
| Solvents: | | | | | | | | | | |
| Toluene | 10 | | 10 | 10 | | | | | | |
| Xylene | | 15 | 15 | | | | 41.7 | | | |
| High Solvency Naphtha (B.P. 347° F.–428° F.) | 41.7 | 66.7 | 25 | 38.9 | 80 | 50 | 25 | | | |
| Butyl Cellosolve Acetate | 33.3 | 33.3 | | 11.1 | | 25 | 33.3 | 25.0 | 25 | 25 |
| Methyl Isobutyl Ketone | | | | | | 25 | | | | |
| Butanol | | | 50 | 25.0 | 20 | | | 25.0 | 25 | 25 |
| High Solvency Naphtha D (B.P. 302° F.–365° F.) | | | | | | | | 50.0 | 50 | 50 |
| Viscosity | Z2 | Z3 | Y | Y–½ | Z1 | Y | Z2 | Z4+½ | Z4+½ | Y–½ |
| N.V. | 48.4 | 52.2 | 51.0 | 49.8 | 49.7 | 48.2 | 47.0 | 47.9 | 46.4 | 46.9 |

The above interpolymers result in film properties on the same order as that of Example I when formulated into paints. Processing of these interpolymers can be carried out in a manner substantially the same as that shown in Example I.

A preferred coating composition comprises about 10% to 15% by weight of hexamethoxymethyl melamine and an interpolymer comprising from about 65% to 69% by weight of ethyl acrylate, from about 12% to 16% by weight of styrene, about 15% by weight of acrylonitrile, and about 4% by weight of methacrylic acid.

The use of acrylonitrile in the composition has been found to be very important. Enamels having an interpolymer with acrylonitrile and other enamels having a similar interpolymer without acrylonitrile have been compared. It has been found that enamel with the acrylonitrile is superior to that without. One set of test results is given in the table which follows. In conducting these tests, two enamels were prepared in the manner described previously in the examples. The interpolymers were the same excepting that one included acrylonitrile while the other did not. The enamel having an interpolymer with acrylonitrile is identified as "A" and the enamel having an interpolymer without acrylonitrile is identified as "B":

| Metal Substrata | Enamel No. | Baking Schedule | Reverse Impact | Adhesion Over Impact Bump | Flexibility (O.T. Bend) | Adhesion Over Bend Edge | Pencil Hardness (Passes) | Acetone Resistance |
|---|---|---|---|---|---|---|---|---|
| Stainless Steel | A | 60 seconds at 525° F | 10 (135) | 10 | 9½ | 9½ | F | Excellent. |
|  | B |  | 9½ (135) | 9½ | 8 | 6 | F+ | Do. |
| No. 1000 Bonderite Steel | A | 60 seconds at 525° F plus | 8 (135) | 8 | 8 | 8 | F | Fair-Good. |
|  | B | 60 seconds at 525° F | 5 (135) | 3 | 0 | 0 | F | Fair. |
| Tin Dipped Steel | A | 60 seconds at 525° F | 10 (25) | 10 | 9 | 6 | F | Excellent. |
|  | B |  | 10 (25) | 10 | 3 | 0 | F | Do. |
| Galvanized Steel | A | do | 7 (135) | 6 | 5 | 4 | H | Very good. |
|  | B |  | 3 (135) | 1 | 5 | 3 | 2H | Do. |
| Cold Rolled Steel | A | 60 seconds at 525° F plus | 8½ (135) | 8½ | 9½ | 9½ | F | Fair-Good. |
|  | B | 60 seconds at 525° F | 5 (135) | 3 | 7 | 5 | F | Good. |
| Copper | A | 60 seconds at 525° F | 9½ (35) | 9½ | 9 | 8½ | F | Do. |
|  | B |  | 5 (35) | 3 | 7 | 5 | F | Do. |
| Tin Plate Steel | A | do | 10-(25) | 10 | 9 | 1 | F | Excellent. |
|  | B |  | 9½ (25) | 9 | 3 | 0 | F | Do. |

Figures in parenthesis are pound-inch impact values.

As can be seen from the table, cured films of enamels "A" and "B" showed about equal hardness and acetone resistance. The other film properties, however, namely, impact resistance, flexibility and adhesion were superior in enamel "A," wherein the interpolymer contained acrylonitrile, as compared to enamel "B," wherein the interpolymer did not contain acrylonitrile.

Having thus described my invention, I claim:

1. A resinous coating composition consisting essentially of a volatile organic solvent containing in solution from about 5% to 20% by weight of substantially monomeric hexamethoxymethyl melamine, from about 80% to 95% by weight of an interpolymer consisting essentially of (a) from about 50% to 70% by weight of a monomer selected from the group consisting of ethyl acrylate, butyl acrylate and butyl methacrylate, (b) from about 0% to 20% by weight of a monomer selected from the group consisting of methyl methacrylate, styrene and vinyl toluene, (c) from about 2% to 8% by weight of an acid selected from the group consisting of acrylic acid, methacrylic acid, itaconic acid and itaconic anhydride, and (d) from about 10% to 30% by weight of acrylonitrile.

2. A liquid resinous coating composition consisting essentially of a volatile organic solvent containing in solution from about 10% to 15% by weight of substantially monomeric hexamethoxymethyl melamine, from about 85% to 90% by weight of an interpolymer consisting essentially of (a) from about 65% to 69% by weight of ethyl acrylate, (b) from about 12% to 16% by weight of styrene, (c) about 4% by weight of methacrylic acid, and (d) about 15% by weight of acrylonitrile.

3. A metal sheet having a cured coating on at least one face surface thereof, said coating produced from said resinous coating composition as defined in claim 1.

References Cited

UNITED STATES PATENTS

| | | | |
|---|---|---|---|
| 2,338,461 | 1/1944 | Schultze | 117—161 |
| 2,759,910 | 8/1956 | Milne et al. | 260—80.8 |
| 2,993,813 | 7/1961 | Tischbein | 117—161 |
| 3,068,183 | 12/1962 | Strolle | 260—21 |
| 3,211,806 | 10/1965 | Petropoulos et al. | 260—853 |
| 3,215,678 | 11/1965 | Apelman | 260—80.8 |

JOSEPH L. SCHOFER, *Primary Examiner.*

STANFORD M. LEVIN, *Assistant Examiner.*

U.S. Cl. X.R.

117—132, 855; 260—29.1, 41, 80.8